(12) United States Patent
Wild

(10) Patent No.: US 12,247,385 B2
(45) Date of Patent: Mar. 11, 2025

(54) WALL TO WALL DRAIN ASSEMBLY

(71) Applicant: Stefan Wild, Winter Garden, FL (US)

(72) Inventor: Stefan Wild, Winter Garden, FL (US)

(73) Assignee: Dural, Inc., Tunnel Hill, GA (US)

( * ) Notice: Subject to any disclaimer, the term of this patent is extended or adjusted under 35 U.S.C. 154(b) by 0 days.

(21) Appl. No.: 17/569,410

(22) Filed: Jan. 5, 2022

(65) Prior Publication Data

US 2022/0127836 A1    Apr. 28, 2022

(51) Int. Cl.
*E03F 5/04*    (2006.01)
(52) U.S. Cl.
CPC .................... *E03F 5/0408* (2013.01)
(58) Field of Classification Search
CPC ........................................ E03F 5/0408
USPC ............................................. 4/679
See application file for complete search history.

(56) References Cited

U.S. PATENT DOCUMENTS

| | | | | |
|---|---|---|---|---|
| 9,334,638 | B1* | 5/2016 | Kirby | A47K 3/40 |
| 2005/0223485 | A1* | 10/2005 | Nijhof | E03F 5/0408 |
| | | | | 4/613 |
| 2016/0130794 | A1* | 5/2016 | Erlebach | E03F 5/0408 |
| | | | | 4/613 |
| 2018/0038091 | A1* | 2/2018 | Ismert | E03F 5/0401 |
| 2021/0040721 | A1* | 2/2021 | Larson | E03F 5/0408 |
| 2021/0381216 | A1* | 12/2021 | Stokes | E03F 5/0408 |

* cited by examiner

*Primary Examiner* — Huyen D Le
(74) *Attorney, Agent, or Firm* — Jason T. Daniel, Esq.; Daniel Law Offices, P.A.

(57) ABSTRACT

The present invention is of a wall to wall drain assembly. The drain assembly comprise of a floor grill, at least one removable end cap, a drain channel, and a drain. The drain assembly may be affixed to a predetermined shower length. The shower dimensions may be of at least thirty inches in length and at most eighty-four inches in length. The drain assembly may require at most two slopes to be installed in a shower floor compartment.

18 Claims, 7 Drawing Sheets

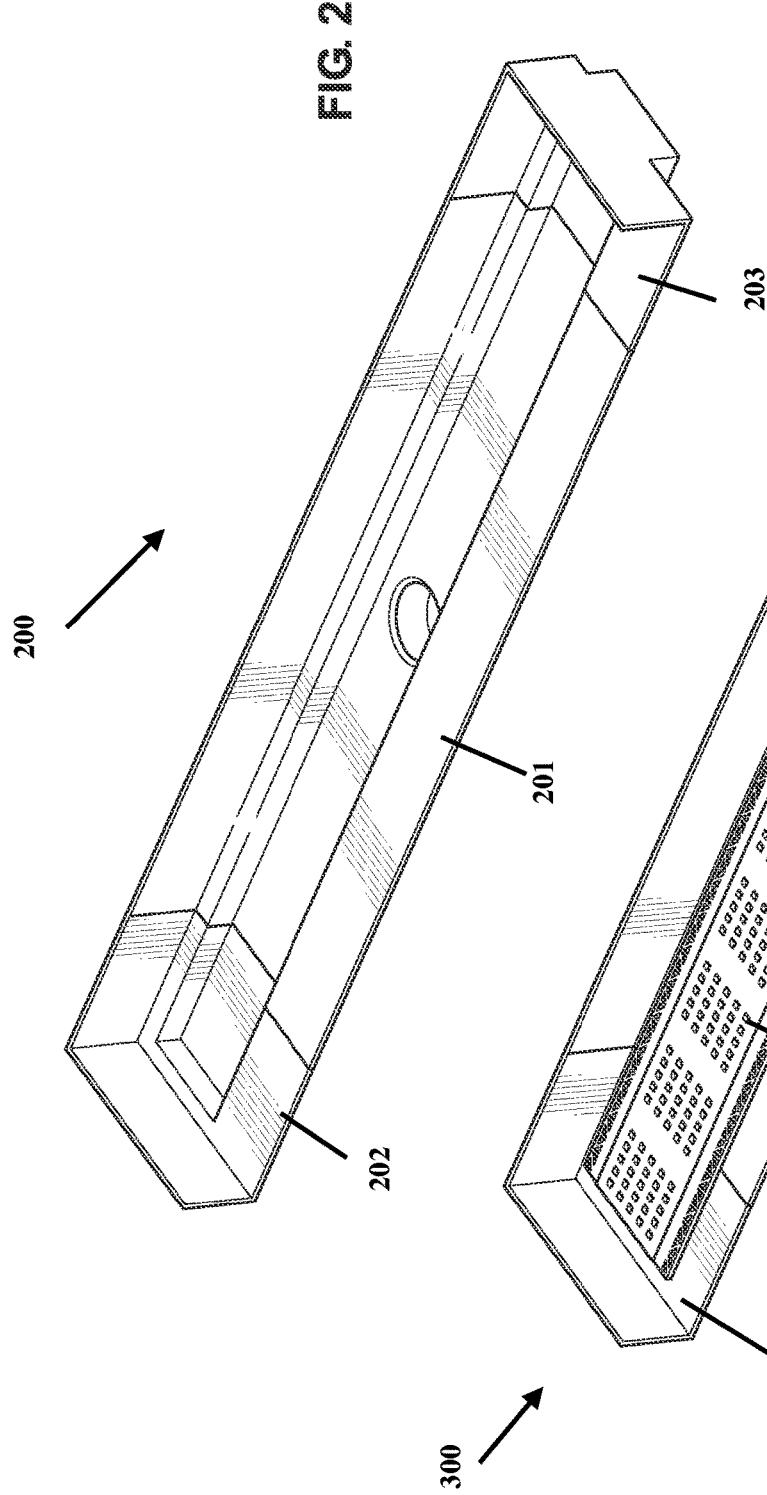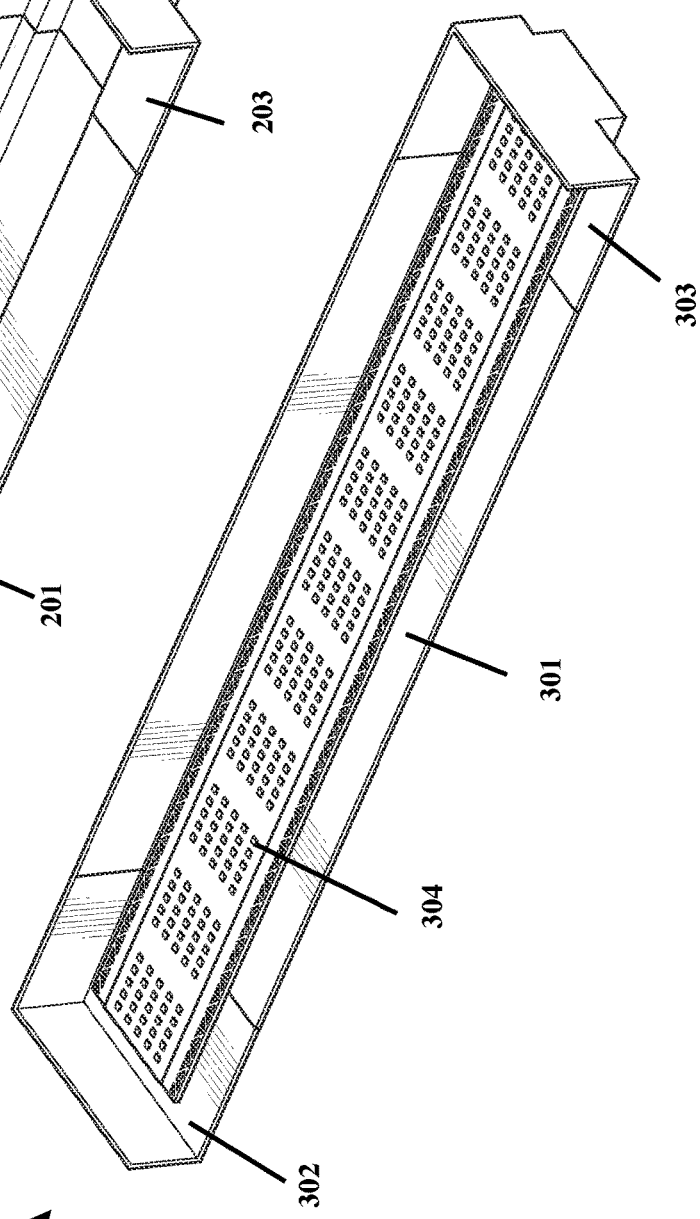

WALL TO WALL DRAIN ASSEMBLY

FIELD OF THE INVENTION

This invention relates to a new and improved wall to wall linear drain assembly.

BACKGROUND

Drains are used throughout the world as a key component to showers. Linear shower drains have increased in popularity over the years. Linear drains allow for the capturing of the flow of water towards a single exit port to deliver liquid from a shower. Linear drains, however, affects the number of slopes that must be inserted in a shower flooring mechanism. The flooring mechanism may for example be ceramic tiles, natural stones, thin flooring, or vinyl. Linear drains require slopping of the floor tile to carry the water into the drain. Currently in the industry, at least four slopes are required. The slopes include a front slope, a back slope, a left side slope, and a right-side slope. The number of slopes that must be inserted into the flooring, limits the size of the tiles that can be used. Tiles must be cut into smaller sizes. Cutting or trimming tiles can be a difficult, costly, and time-consuming task for installers.

SUMMARY OF THE INVENTION

It is essential to the present disclosure, all embodiments are provided as illustrative and non-limiting representatives of various possible embodiments. In addition, the terms "is", "can", "will" and the like are herein uses as synonyms for an interchangeable with terms such as "may", "may provide for", and "it is contemplated that the present invention may" and so forth.

Furthermore, all elements listed by name, encompass all equivalents for such elements. Such equivalents are contemplated for each element named herein.

For purposes of summarizing, certain aspects, advantages, and novel features of the present invention are provided herein. It is to be understood that not all aspects, advantages, or novel features may be provided in any one particular embodiment. Thus, the disclosed subject matter may be embodied or carried out in a manner that achieves or optimizes one aspect, advantages, or novel features or group of features without achieving all aspects, advantages, or novel features as may be taught or suggested.

In view of the foregoing disadvantages inherent in the known art, the present invention provides a novel wall to wall drain assembly. Drains are used throughout the world as a key component to showers. Linear shower drains have increased in popularity over the years. Linear drains allow for the capturing of the flow of water towards a single exit port to deliver liquid from a shower. Linear drains, however, affects the number of slopes that must be inserted in a shower flooring mechanism.

The flooring mechanism may for example be ceramic tiles, natural stones, thin flooring, or vinyl. Linear drains require slopping of the floor tile to carry the water into the drain. Currently in the industry, at least four slopes are required. The slopes include a front slope, a back slope, a left side slope, and a right-side slope. The number of slopes that must be inserted into the flooring, limits the size of the tiles that can be used. Tiles must be cut into smaller sizes. Cutting or trimming tiles can be a difficult, costly, and time-consuming task for installers. This invention provides a solution to this problem.

The present invention allows for a one-sided slope. A one-sided slope gives the installer the opportunity to install very large tiles on the shower floor without grout lines. This invention allows for easiness, flexibility in shower floor and drain installations. Most importantly this invention is a cost-efficient approach to linear shower drain installations.

The features of the invention, which are believed to be novel, are particularly pointed out and distinctly claimed in the concluding portion of the specification. These and other features, aspects, and advantages of the present invention will become better understood with reference to the following drawings and detailed description.

In an embodiment the invention discloses a wall to wall drain assembly. The drain assembly comprise of a floor grill, a removable end cap, a drain channel, and a drain. The drain assembly may be affixed to a predetermined shower length. The shower dimensions may be of at least thirty inches in length and at most eighty-four inches in length. The drain assembly may require at most two slopes to be installed in a shower floor.

The embodiment of the invention described herein are exemplary and numerous modifications, variations, and rearrangements can be readily envisioned to achieve substantially equivalent results, all of which are intended to be embraced within the spirit and scope of the invention. Furthermore, while the preferred embodiment of the invention has been described in terms of the components and configurations, it is understood that the invention is not limited to those specific dimensions or configurations but is to be accorded the full breadth of the spirit of the invention.

BRIEF DESCRIPTION OF THE DRAWINGS

These and other features, aspects and advantages of the present invention will become better understood with regard to the following description, appended claims, and accompanying figures.

FIG. 2 is a perspective view of the embodiments of the present invention.

FIG. 3 is a perspective view of the embodiments of the present invention.

DETAILED DESCRIPTION

The present invention overcomes the limitations of the prior art by providing a novel wall to wall drain assembly.

It is essential to understand that the drawings and the associated descriptions are provided to illustrate potential embodiments of the invention and not to limit the scope of the invention. Reference in the specification to "one embodiment" or "an embodiment" is intended to indicate that a particular feature, structure, or characteristics described in connection with the embodiment is included in at least an embodiment of the invention. The appearances of the phrases "in one embodiment" or "an embodiment" in various places in the specification are not necessarily all referring to the same embodiment.

As used in this disclosure, except where the context requires otherwise, the term "comprise" and various of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known features, elements or techniques may be shown in detail in order not to obscure the embodiments.

Figure 1:
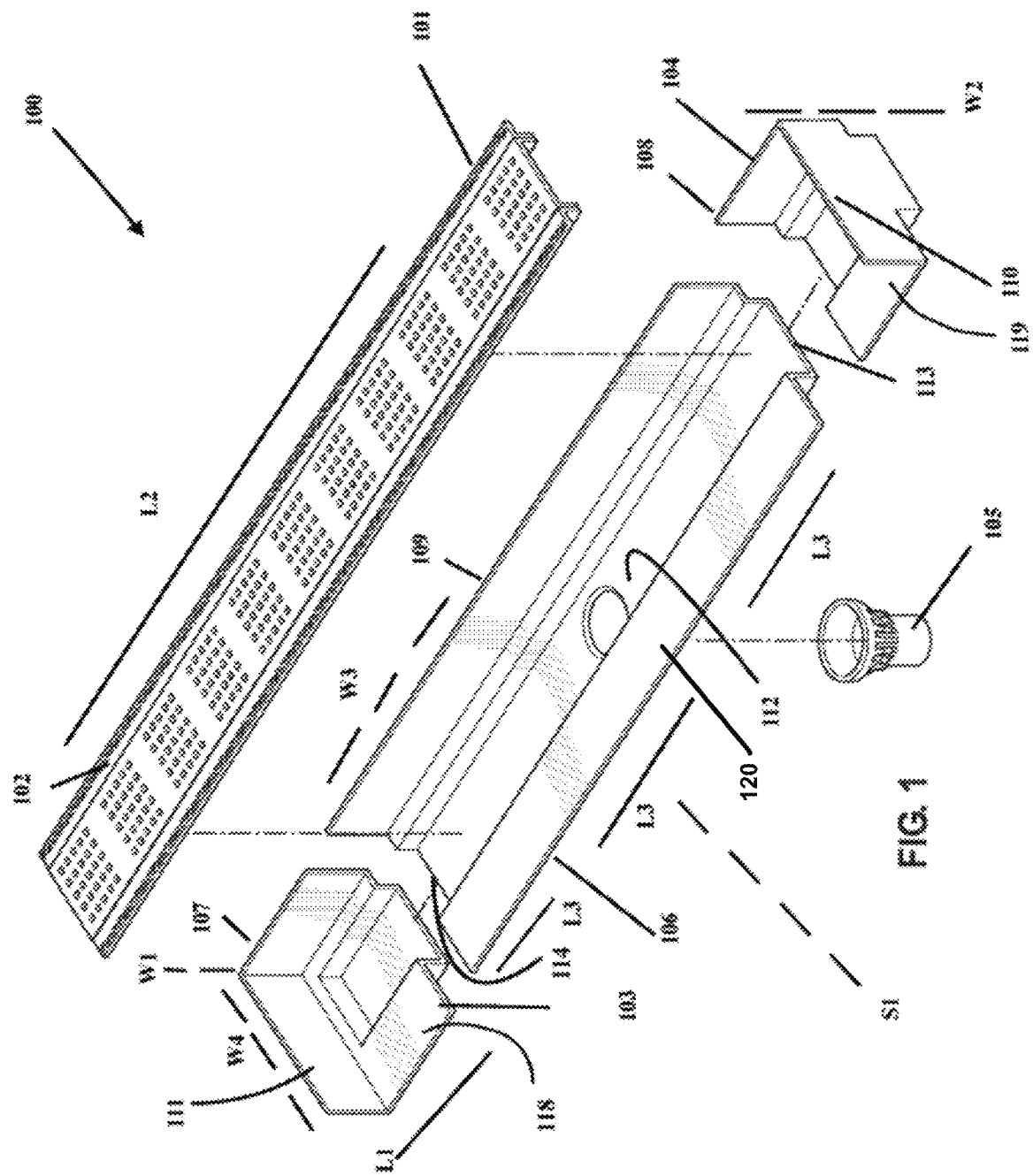
FIG. 1 is an exploded view of an embodiments of the present invention.

FIG. 1 is an exploded view of the embodiments of the present invention. The drain assembly 100 comprise of a plurality of components. The assembly 100 comprise of a floor grill 101, such as a linear floor grille. The assembly 100 may also comprise of a right slidable end cap 104 and a slidable left end cap 103. The assembly 100 may also include a drain channel 106 and a drain 105.

The floor grille 101 may be positioned over the top of the drain channel 106 and the removable end caps 103 and 104. The floor grill 101 may include a plurality of grill inlet openings 102. The grill inlet openings 102 may serve to prevent objects of a predetermined size from reaching the drain channel 106 and the drain 105. The floor grill 101 may be formed as an independent component relative to the main assembly 100 or each individual component forming the assembly. Thus, the floor grill 101 may be an added-on component.

The floor grill 101 may be appropriately sized to counterpart the drain channel 106 and the removable end caps 103 and 104. The floor grill 101 may include a longitudinal dimension, referred to herein as L2, substantially equal to the length of the conjoined body of the drain channel 106 and the removable end caps 103 and 104. While the embodiment of FIG. 1 illustrates a single elongated floor grill 101 covering the entire longitudinal dimension of the drain channel 106, the floor grill 101 may alternatively include a plurality of longitudinal aligned floor grill 101 sections positioned over the top of the drain channel 106 and the removable end caps 103 and 104.

The drain channel 106 may include a longitudinal dimension, referred to herein as L3. The drain channel may comprise of a right body end 114 and a left body end 113, opposite the right body end. The drain channel may further include a vertical panel 109 and a horizontal panel 120, opposite said vertical panel 109. The vertical panel 109 may affix to the back portion of a shower wall, referred to herein as W3. The horizontal panel 120 may affix to a shower floor. The drain channel's right body end 114 and left body end 113 may couple to the end caps 103 and 104. The vertical panel 109 and the horizontal panel 120 provides waterproofing to a shower.

Figure 4:
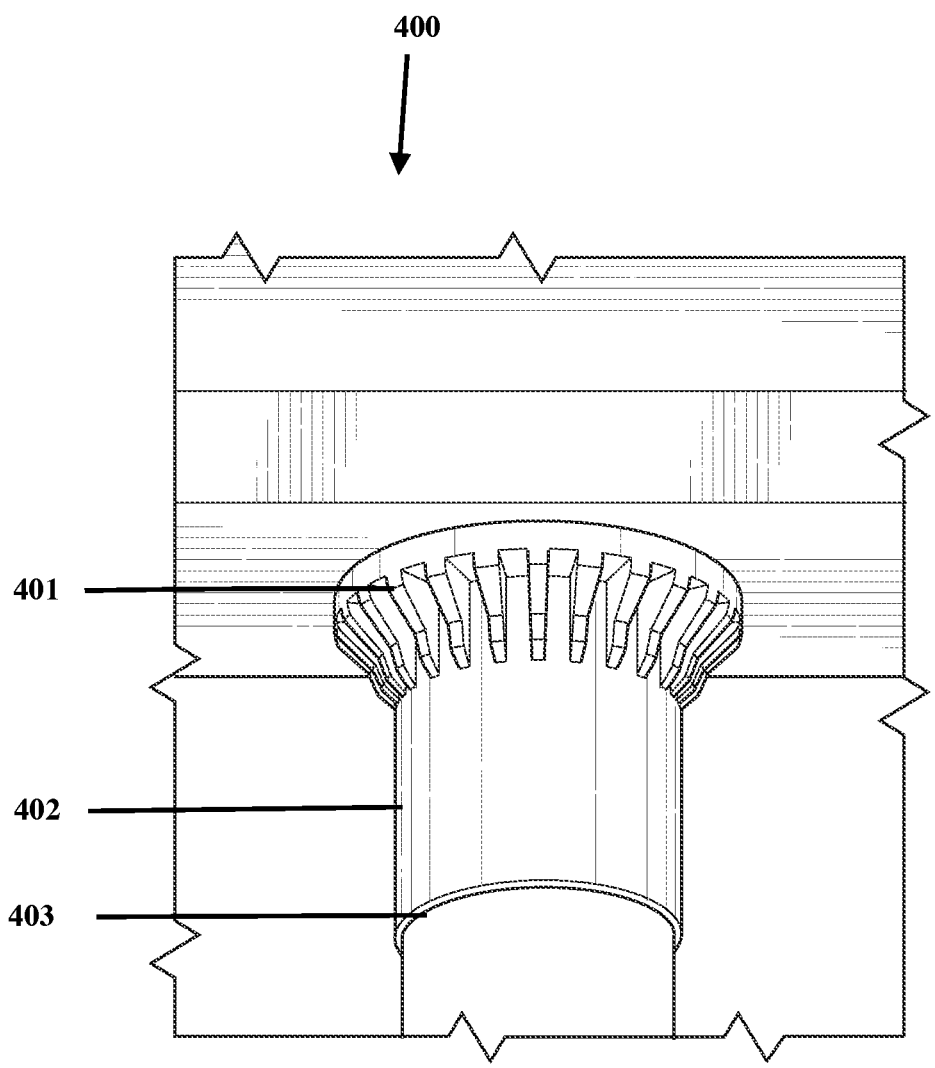
FIG. 4 is a perspective view of the draining component of the present invention.

The drain channel 106 may comprise of a drain opening 112 to allow for the coupling of the drain 105 to the system 100. As shown in FIG. 4, drain 400, may fixedly couple to the drain channel. The drain 400 may comprise of a hub 401, a tube 402, and a tube opening 403.

The removable left end cap 103 may include a longitudinal dimension, referred to herein as L1. The removable left end cap's elevated panel 107 may affix to the back portion of a shower wall, referred to herein as W3. The left end cap's mid elevated panel 111 may affix to a left portion of a shower wall, referred to herein as W4. The left end cap's flat front panel 118 may affix to a shower floor.

The removable right end cap 104 may include a longitudinal dimension, referred to herein as L1. The removable right end cap's right panel 108 may affix to the back portion of a shower wall, referred to herein as W3. The right end cap's mid panel 110 may affix to a right portion of a shower wall referred to herein as W4. The right end cap's flat front panel 119 may affix to a shower floor.

The removable right end cap 104 and the removable left end cap 103 may removably couple to the drain channel 106. The removable end caps may be adjusted to allow for the system 100 to be at least thirty inches and at most eighty inches. The system 100 may be readjusted to fit within a predetermined shower length, and attach to the showers walls, herein referred to as W2, W3, and W4.

Figure 6:
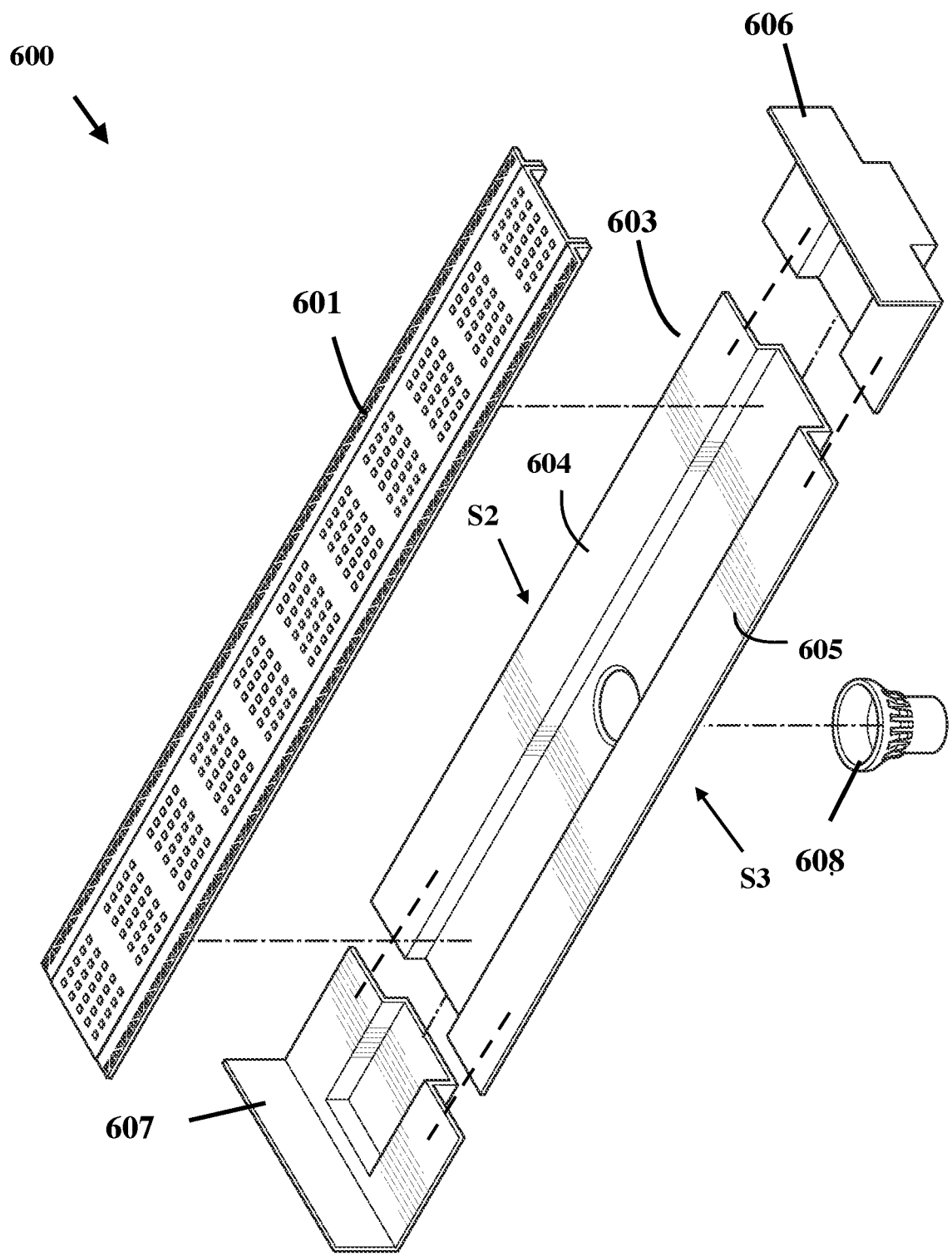
FIG. 6 is an exploded view of an embodiments of the present invention.

The current invention is novel in that it requires at most two slopes in a shower drain flooring installation. The draining assemblies currently in market requires at least four slopes in a shower drain flooring installation. This invention allows for the input of bigger tiles. With bigger tiles, flooring specialist will save time and money in installing tile floors. As shown in FIG. 1, the embodiment only requires the placement of one slope into the shower drain flooring mechanism for proper functioning, the slope demonstrated herein is referred to as, S1. As shown in FIG. 6, the embodiment only requires the placement of at most two slopes into the shower drain flooring mechanism, the slope demonstrated herein is referred to as, S2 and S3.

Figure 5:
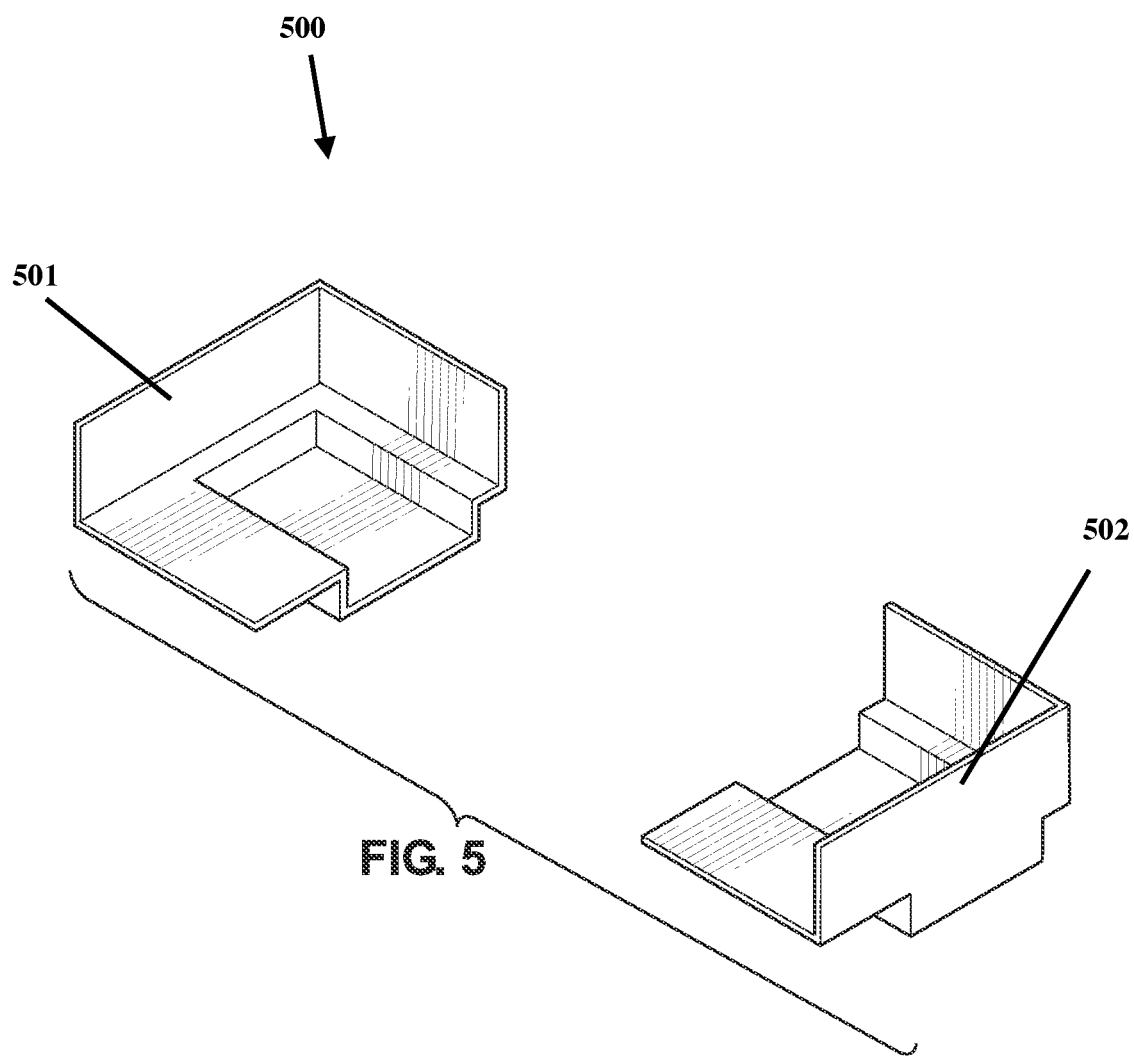
FIG. 5 is a perspective view of the end cap components of the present invention.

FIG. 2 is another exploded view of the embodiments of the present invention. Assembly 200 comprise of the drain channel 201, the removable right end cap 202, and the removable left end cap 203. The removable left end cap 203 and the removable right end cap 202 may slidably couple to the drain channel 201. The end caps 202, 203, may be adjusted to fit a predetermined length of a shower. The shower dimensions may be of at least thirty inches in length and at most eighty-four inches in length. As shown in FIG. 5, the removable end caps 501 and 502 may be formed as an independent component relative to the main assembly 100 or each individual component forming the assembly. Thus, the removable end caps 501 and 502 may be an added-on and stand-alone component. The drain channel 201, may comprise of an inlet opening 204 for the coupling of a drain (not shown). As shown in FIG. 3, floor grill 304 may affix to the top of the drain channel 201 and the end caps 202, 203. The floor grill 304 may be adjusted to fit a predetermined length of a shower. For example, the floor grill 304 may be cut to comport to the slidable end caps 302 and 303. Turning attention to FIG. 6.

Figure 7:
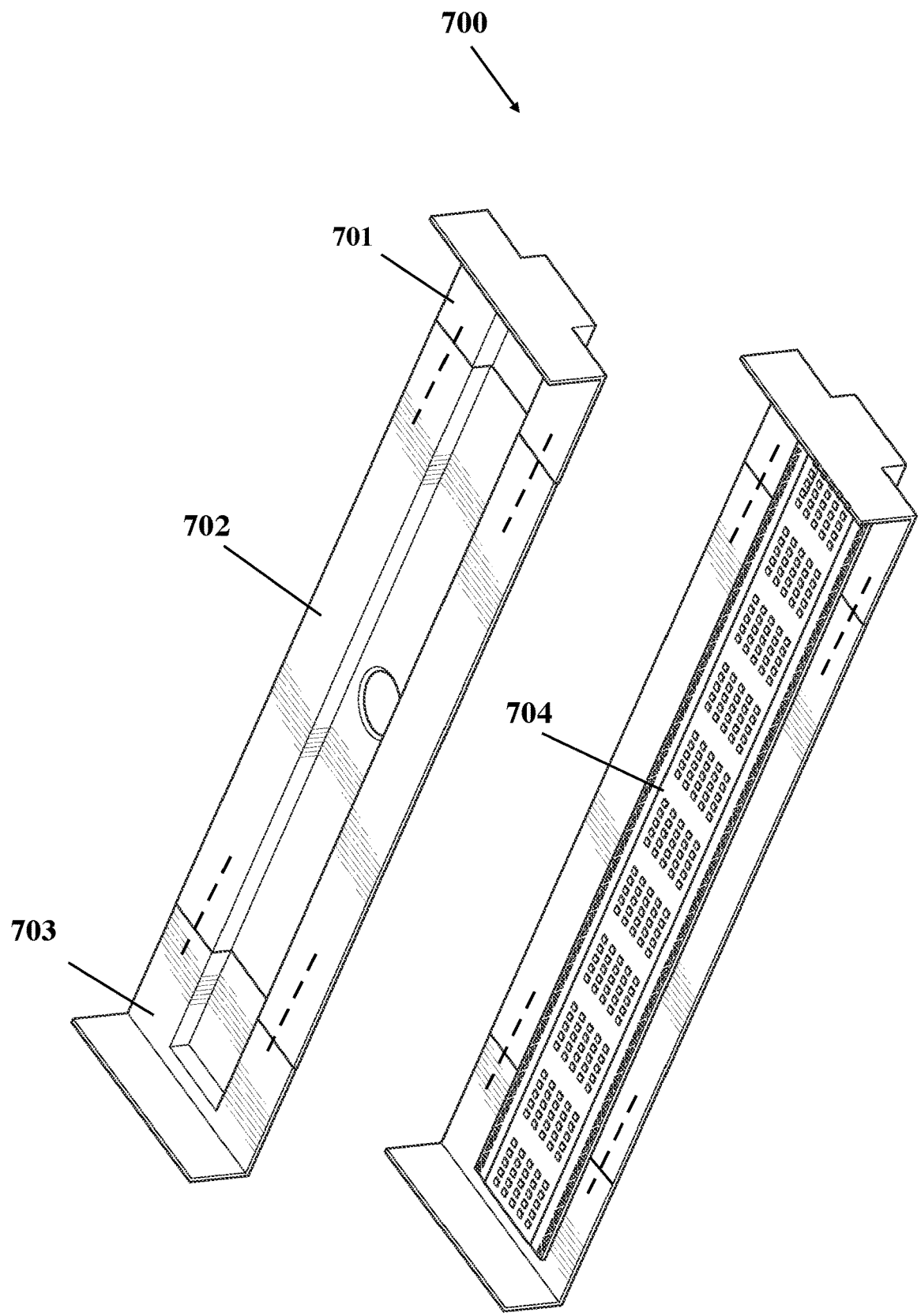
FIG. 7 is a perspective view of an embodiments of the present invention.
Figure 8A:
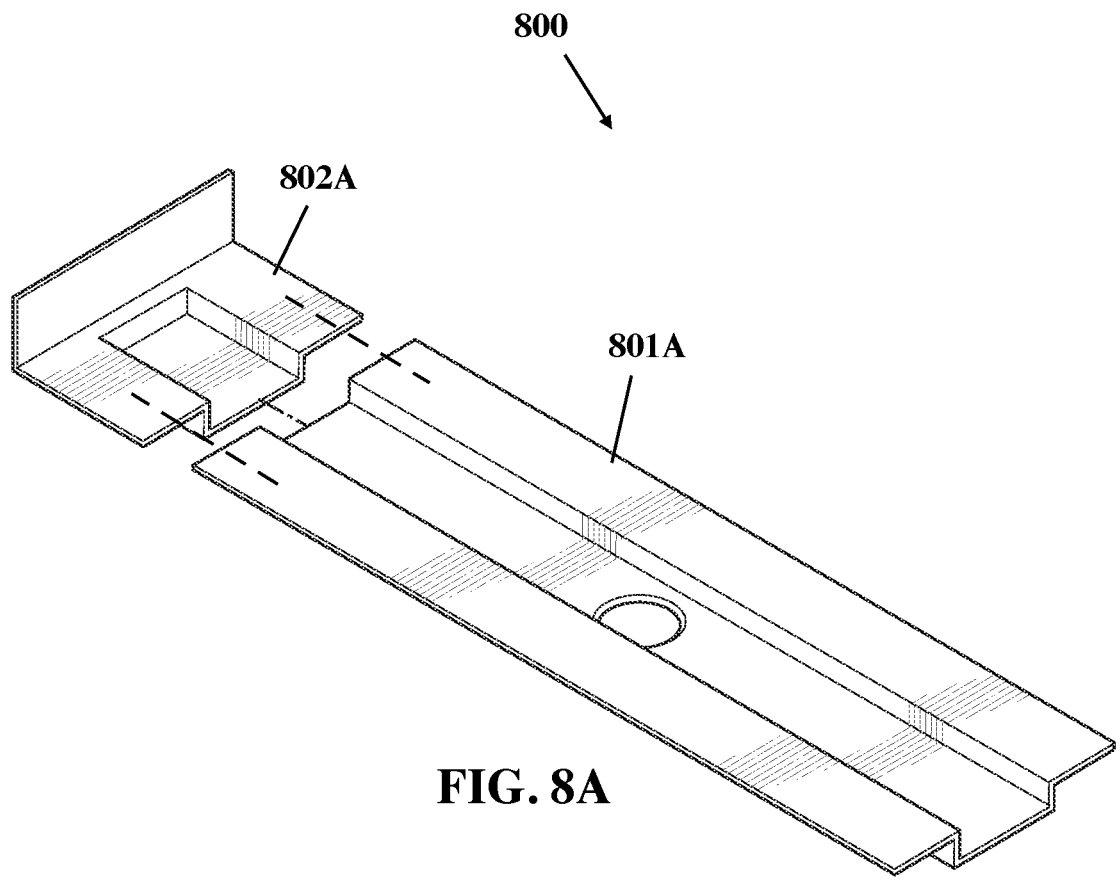
FIG. 8A is a perspective view of the end cap component of the present invention.
Figure 8B:
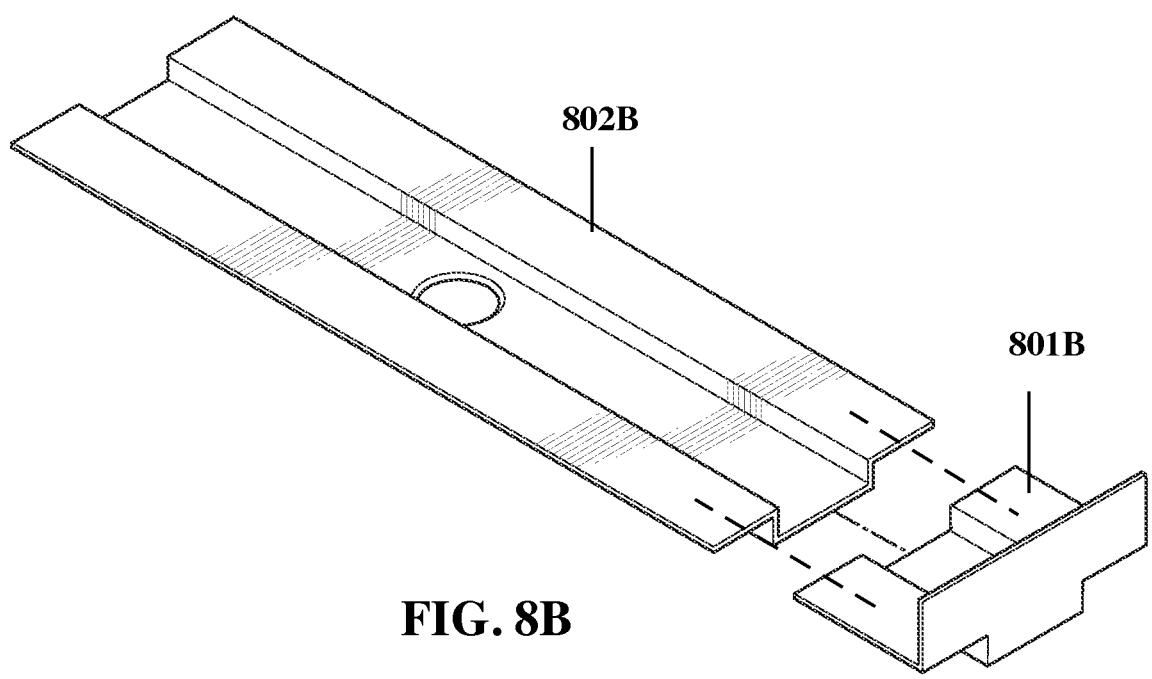
FIG. 8B is a perspective view of the end cap component of the present invention.

FIG. 6 is an exploded view of an embodiments of the present invention. The drain 603 may comprise of a first flat panel 604 and a second flat panel 605. The first horizontal panel 604 and a second horizontal panel 605 may be affixed to the floor of a shower. The system 600 may be positioned anywhere on a shower floor and thus allows for more flexibility in the positioning of the drainage outlet on a shower floor. Interchangeable endcaps 604 and 605 may interchangeably affix to the right body end of the drain channel 603 or the left body end of the drain channel 603, as shown in FIG. 8A and FIG. 8B. The endcaps may be affixed to a shower wall. With interchangeable endcaps 604 and 605, the embodiment only requires the placement of two slopes into the shower drain flooring mechanism for proper functioning, the slope demonstrated herein is referred to as, S2 and S3. The requirement for only two slopes, will allow for the installation of bigger tiles, and thus save industry users time and money. As shown in FIG. 7, the floor grille 704, may affix and cover the opening of the drain. The floor grill 704 may include a plurality of grill inlet openings. The grill inlet openings may serve to prevent objects of a predetermined size from reaching the drain channel and the drain. The floor grill may be formed as an independent component relative to the main assembly or each individual component forming the assembly. Thus, the floor grill may be an added-on component.

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in the disclosure.

All features disclosed in the specification, including the claims, abstracts, and drawings, and all steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or some similar purpose, unless expressly stated otherwise. Thus, unless expressly stated otherwise, each feature disclosed is one example only of a generic series of equivalent or similar features.

While the present invention generally described herein has been disclosed in connection with a number of embodiments shown and described in detail, various modifications should be readily apparent to those of skill in the art.

What is claimed is:

1. A wall to wall drain assembly comprising:
    a central drain channel having a generally U-shaped bottom wall, a back wall, a front wall, a right body end and a left body end;
    a removable end cap that is configured to engage at least one of the right body end or the left body end of the drain channel;
    a drain that is configured to engage the bottom wall of the drain channel; and
    a floor grill that is configured to engage each of the front wall, the back wall and the removable end cap,
    wherein the back wall is configured to engage a vertical shower wall and comprises a flat panel that extends away from the bottom wall in a perpendicular orientation, and
    wherein the front wall comprises is configured to engage a shower floor and comprises a flat panel that extends away from the bottom wall in a parallel orientation.

2. The wall to wall drain assembly of claim 1, wherein the removable end cap is coupled to the right body end.

3. The wall to wall drain assembly of claim 1, wherein the removable end cap is coupled to the left body end.

4. The wall to wall drain assembly of claim 1, wherein the removable end cap interchangeably couples to the right body end and the left body end.

5. The wall to wall drain assembly of claim 1, further comprising:
    an opening that is positioned along the bottom wall, and wherein the drain is affixed to the opening.

6. The wall to wall drain assembly of claim 1, wherein the removable end cap includes a vertical panel portion that is configured to affix to a right most portion of a shower wall.

7. The wall to wall drain assembly of claim 1, wherein the removable end cap includes a vertical panel portion that is configured to affix to a left most portion of a shower wall.

8. The wall to wall drain assembly of claim 1, wherein the removable end cap includes a first vertical panel portion that is configured to affix to a back portion of a shower wall, and a second vertical panel portion that is configured to affix to either a left most portion of a shower wall or a right most portion of a shower wall.

9. The wall to wall drain assembly of claim 1, wherein the floor grill comprise of a plurality of inlet openings.

10. The wall to wall drain assembly of claim 1, wherein the floor grill is adjustable in length.

11. The wall to wall drain assembly of claim 1, wherein the removable end cap is adjustable in length.

12. The wall to wall drain assembly of claim 1, wherein the removable end cap comprise of a left end cap and a right end cap.

13. The wall to wall drain assembly of claim 1, wherein the removable end cap comprise of an interchangeable end cap.

14. The wall to wall drain assembly of claim 1, further comprising: a plurality of length adjusters operatively coupled to the central drain channel, wherein said length adjuster extend the length of the main body.

15. The wall to wall drain assembly of claim 14, wherein said length adjuster control a position of said floor grill relative to said center body.

16. The wall to wall drain assembly of claim 14, wherein said length adjuster controls a position of a slope in a shower floor installment.

17. The wall to wall drain assembly of claim 14, wherein the slope is at most two slopes.

18. The wall to wall drain assembly of claim 1, further comprising: a plurality of length adjusters operatively coupled to the central drain channel, wherein said length adjuster shortens the length of the main body.

* * * * *